(12) United States Patent
Riverso et al.

(10) Patent No.: US 11,329,485 B2
(45) Date of Patent: May 10, 2022

(54) METHOD FOR CONTROLLING BUILDING POWER CONSUMPTION

(71) Applicant: CARRIER CORPORATION, Palm Beach Gardens, FL (US)

(72) Inventors: Stefano Riverso, Cork City (IE); Marcello Torchio, Cork (IE); Sarah O'Connell, Cork (IE)

(73) Assignee: Carrier Corporation, Palm Beach Gardens, FL (US)

( * ) Notice: Subject to any disclaimer, the term of this patent is extended or adjusted under 35 U.S.C. 154(b) by 46 days.

(21) Appl. No.: 16/851,524

(22) Filed: Apr. 17, 2020

(65) Prior Publication Data
US 2020/0335970 A1 Oct. 22, 2020

Related U.S. Application Data

(60) Provisional application No. 62/835,130, filed on Apr. 17, 2019.

(51) Int. Cl.
| | |
|---|---|
| *F24F 11/62* | (2018.01) |
| *F24F 11/30* | (2018.01) |
| *G06Q 10/10* | (2012.01) |
| *H02J 3/12* | (2006.01) |
| *H02J 13/00* | (2006.01) |
| *G05B 13/04* | (2006.01) |

(52) U.S. Cl.
CPC .............. *H02J 3/12* (2013.01); *G05B 13/048* (2013.01); *H02J 13/00006* (2020.01); *H02J 2203/20* (2020.01)

(58) Field of Classification Search
CPC .... H02J 3/12; H02J 13/00006; H02J 2203/20; H02J 3/00; G05B 13/048; G05B 15/02; G05B 2219/2639; G05B 2219/2642; G05B 17/02; Y02B 90/20; Y04S 20/00; Y04S 40/12
See application file for complete search history.

(56) References Cited

U.S. PATENT DOCUMENTS

| | | |
|---|---|---|
| 8,571,955 B2 | 10/2013 | Al Faruque et al. |
| 8,880,226 B2 | 11/2014 | Raman et al. |
| 8,957,634 B2 | 2/2015 | Lo et al. |
| 9,367,108 B2 | 6/2016 | Asghari et al. |
| 9,429,927 B2 | 8/2016 | Nesler et al. |
| 9,595,070 B2 | 3/2017 | Matsuoka et al. |
| 9,671,768 B2 | 6/2017 | Lo et al. |
| 9,731,615 B2 | 8/2017 | Uyeki et al. |
| 9,740,183 B2 | 8/2017 | Chen |

(Continued)

OTHER PUBLICATIONS

The Extended European Search Report for European Patent Application No. 20167180.7 dated Jul. 17, 2020.

*Primary Examiner* — Ramesh B Patel
(74) *Attorney, Agent, or Firm* — Carlson, Gaskey & Olds, P.C.

(57) ABSTRACT

A method for controlling power consumption includes estimating power flexibility for one or more electrical systems in a building, presenting one or more power flexibility options to a user in the building, and communicating power set points to the one or more electrical systems based on a power flexibility option selected by the user. A system for predicting energy consumption of a building is also disclosed.

18 Claims, 2 Drawing Sheets

(56) References Cited

U.S. PATENT DOCUMENTS

| | | |
|---|---|---|
| 2007/0255461 A1* | 11/2007 | Brickfield .................. H02J 3/14 |
| | | 700/295 |
| 2010/0017045 A1 | 1/2010 | Nesler et al. |
| 2010/0138363 A1 | 6/2010 | Batterberry et al. |
| 2012/0323382 A1* | 12/2012 | Kamel .................. G01R 21/133 |
| | | 700/286 |
| 2013/0134962 A1* | 5/2013 | Kamel .............. H02J 13/00002 |
| | | 324/103 R |
| 2013/0198023 A1* | 8/2013 | El Khayat .............. G06Q 30/06 |
| | | 705/26.1 |
| 2014/0163757 A1 | 6/2014 | Murayama et al. |
| 2015/0066404 A1* | 3/2015 | Scelzi ...................... G01K 7/04 |
| | | 702/60 |
| 2015/0200544 A1* | 7/2015 | Kitaji ................ H02J 13/00004 |
| | | 700/295 |
| 2016/0187395 A1* | 6/2016 | Bodas .................. G06F 11/3062 |
| | | 702/60 |
| 2016/0223214 A1 | 8/2016 | Turner et al. |
| 2016/0320081 A1 | 11/2016 | Nikovski |
| 2016/0334825 A1 | 11/2016 | Nesler et al. |
| 2016/0378127 A1* | 12/2016 | Scelzi .................... G05B 11/01 |
| | | 700/295 |
| 2017/0102162 A1 | 4/2017 | Drees et al. |
| 2017/0133866 A1* | 5/2017 | Itoh .................. H02J 13/00028 |
| 2017/0163084 A1 | 6/2017 | Malone |
| 2017/0177766 A1 | 6/2017 | Song et al. |
| 2017/0207633 A1 | 7/2017 | Nakayama et al. |
| 2017/0256004 A1 | 9/2017 | Hooshmand et al. |
| 2018/0196456 A1 | 7/2018 | Elbsat |
| 2018/0262008 A1* | 9/2018 | Terauchi .................. H02J 3/004 |
| 2019/0324411 A1* | 10/2019 | Van ........................... H02J 3/00 |
| 2019/0338976 A1* | 11/2019 | Chakraborty .......... G05B 15/02 |
| 2019/0339311 A1* | 11/2019 | Guzman .............. G01R 21/133 |
| 2020/0059098 A1* | 2/2020 | Dong ..................... G06Q 50/06 |
| 2020/0333032 A1* | 10/2020 | Riverso ................ G05B 19/042 |

* cited by examiner

METHOD FOR CONTROLLING BUILDING POWER CONSUMPTION

CROSS-REFERENCE TO RELATED APPLICATIONS

This application claims priority to U.S. Provisional Application No. 62/835,130, which was filed on Apr. 17, 2019, and is incorporated herein by reference.

BACKGROUND

Buildings, such as university buildings, office buildings, residential buildings, commercial buildings, and the like, incorporate one or more electrically powered systems and devices. The electrically powered systems and devices, or loads, can be powered at least partially by electricity supplied from a centralized electrical power source or utility ("electrical grid"). The electrically powered systems and devices communicate with the electrical grid regarding power demand and availability.

SUMMARY

A method for controlling power consumption according to an example of this disclosure includes estimating power flexibility for one or more electrical systems in a building, presenting one or more power flexibility options to a user in the building, and communicating power set points to the one or more electrical systems based on a power flexibility option selected by the user.

In a further example of the foregoing method, at least one of the one or more power flexibility options includes a comfort trade-off.

In a further example of any of the foregoing methods, power flexibility points are discovered in the building, and power flexibility is estimated at the power flexibility points.

In a further example of any of the foregoing methods, estimating is based on historical electrical power consumption data of the one or more electrical systems.

In a further example of any of the foregoing methods, estimating includes developing a mathematical model of electrical power consumption of the one or more electrical systems based on the historical electrical power consumption data.

In a further example of any of the foregoing methods, the power set points are optimized.

In a further example of any of the foregoing methods, a check is performed to determine whether a fast demand request from an electrical power source is in progress.

In a further example of any of the foregoing methods, a check is performed to determine whether the power set points are within a new power demand of the fast demand request if a fast demand request is in progress.

In a further example of any of the foregoing methods, one or more new flexibility options are presented to the user if the power set points are within the new power demand.

In a further example of any of the foregoing methods, the one or more electrical systems include at least one of a climate system, a lighting system, and a security system.

A system for predicting energy consumption of a building according to an example of this disclosure includes one or more electrical systems, one or more interfaces at each of the electrical systems, and a computing device in communication with the one or more electrical systems that is configured to estimate power flexibility for the one or more electrical systems, present one or more power flexibility options to a user via the one or more interfaces, and communicate power set points to the one or more electrical systems based on a power flexibility option selected by the user at the one or more interfaces.

In a further example of the foregoing system, the building energy management system is configured to estimate power flexibility at flexibility points in the building, and one or more flexibility points are controllers of the one or more electrical systems.

In a further example of any of the foregoing systems, the one or more electrical systems includes a controller, and the controllers receive the power set points from the computing device.

In a further example of any of the foregoing systems, the computing device is configured to model electrical power consumption of the one or more electrical systems based on historical electrical power consumption data of the one or more electrical systems.

In a further example of any of the foregoing systems, at least one of the one or more flexibility options include a comfort trade-off.

In a further example of any of the foregoing systems, the computing device is in communication with an electrical power source.

In a further example of any of the foregoing systems, the electrical power source is a smart grid.

In a further example of any of the foregoing systems, the electrical power source is configured to determine whether a fast demand request from the electrical power source is in progress.

In a further example of any of the foregoing systems, the electrical power source is configured to present new flexibility options to a user if a fast demand request is in progress.

In a further example of any of the foregoing systems, the one or more electrical systems include at least one of a climate system, a lighting system, and a security system.

DETAILED DESCRIPTION

Demand-side management (DSM) for electric systems and devices includes various methods and directives for reducing power demand on centralized electrical power sources by electrical systems and devices. These methods and directives can include incorporating energy sources other than electrical power, (e.g., solar power or other forms of renewable energy), incorporating electrical power storage systems, and controlling flexible power demands. Generally, the electrical power source is in communication with the systems or devices (e.g., one or more loads) to which it provides electrical power. The electrical power source and load(s) share information and make decisions about how and when to produce and consume electrical power. In this way, DSM allows an electrical power source, such as a "smart" electrical grid, to balance power production and consumption.

Where the power demand of the load is flexible, DSM can be employed to improve the efficiency of power generation. The electrical power source communicates information about power generation and consumption to the electrical load. In this way, the load can respond to the information from the electrical power source. For instance, at peak electrical demand times, the electrical load can reduce power consumption.

Figure 1:
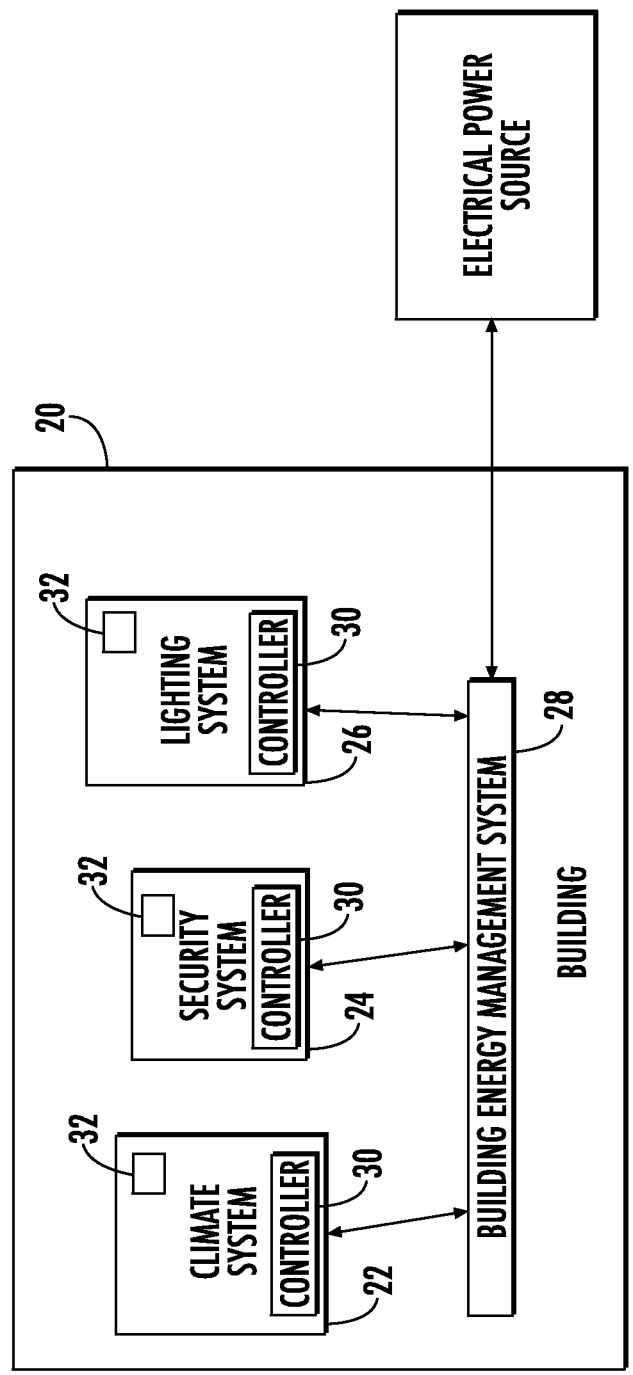
FIG. 1 schematically illustrates a building having one or more electrical systems.

FIG. 1 schematically illustrates a building 20. Building 20 incorporates at least one load, such as climate control or heating, ventilation, and air conditioning (HVAC) system 22, lighting system 24, and security system 26, though other electrical systems are known in the art. Some of these systems may have flexible power demands which change over time. For instance, the power demand may vary with building occupancy, exterior climate, occupant comfort requirements, and the like. The systems 22, 24, 26 are in communication with a building energy management system (BEMS) 28. Though the BEMS 28 is shown in the building 20 in FIG. 1, it should be understood that the BEMS 28 may in whole or in part be deployed at a location remote from the building 20, e.g., via cloud technology.

The BEMS 28 is or includes a computing device, such as a processor, that is configured to receive and analyze information regarding system 22, 24, 26 current electrical power requirements and historical electrical power consumption profiles. The BEMS 28 is also configured to receive information from an electrical power source, such as a "smart grid," in the form of requests for either information regarding the building 20 power consumption or requests to change the power consumption for the building 20. The BEMS 28 is also configured to receive input from users, e.g., building 20 occupants, regarding occupant requirements for the building 20 operation, as will be discussed in more detail below. Finally, the BEMS 28 is configured to direct the systems 22, 24, 26 to operate within certain power consumption set points based on the various inputs discussed above.

The systems 22, 24, 26 include controllers 30. The controllers 30 are or include computing devices such as processors and/or electrical components programmed so that the controllers 30 can perform as described herein. The controllers 30 are operable to collect and analyze data regarding historical and current electrical power consumption and requirements of the systems 22, 24, 26, communicate the data to the BEMS 28, receive signals from the BEMS regarding electrical power consumption, and control the systems 22, 24, 26 to operate within electrical power set points communicated from the BEMS 28. The controllers 30 are also operable to receive and analyze inputs from users in the building 20 via interfaces 32. Each system 22, 24, 26 may have one or more interfaces 32 throughout the building 20.

In one example, the systems 22, 24, 26 are part of an "internet of things" and share information with one another and with the BEMS 28 via controllers 30. The BEMS 28 may also be in communication with a "legacy" or existing building management system in the building 20. The legacy building management system can report information about the systems 22, 24, 26 to the BEMS 28, for example.

Figure 2:
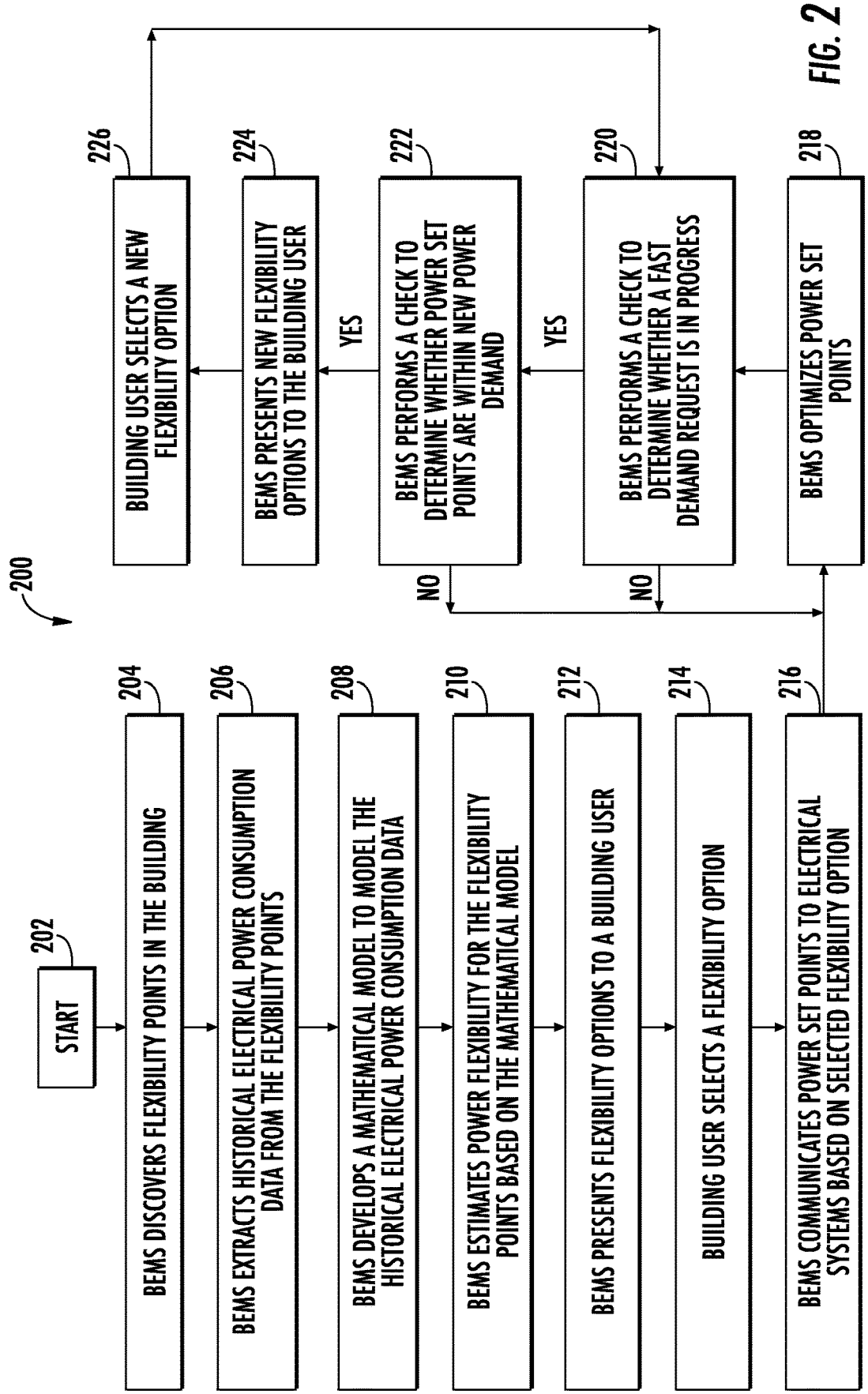
FIG. 2 schematically illustrates a method for controlling power consumption of the building of FIG. 1.

FIG. 2 schematically shows a method 200 for controlling building 20 electrical power consumption. In step 202, the method 200 starts. In one example, the method 200 starts automatically, or without any user input. In one example, the method 200 starts automatically due to an automatic demand response request from the electrical power source (e.g., smart grid). In another example, the BEMS 28 is programmed to start the method 200 at a predetermined time of day. In another example, the BEMS 28 is programmed to start the method 200 at predetermined time intervals.

In step 204, BEMS 28 discovers "flexibility points" in the building 20. Flexibility points are electrical devices or systems that have flexible electrical power requirements, such as the systems 22, 24, 26 discussed above. For instance, the system 22, 24, 26 electrical power consumption may be variable (flexible) based on number of building occupants, location of the occupants within the building, occupant preferences, or other variables. In one example, the building 20 is an office building. The office building 20 may be occupied during normal business hours and not occupied at night time. Therefore, requirements for lighting and heating/cooling the building 20, for instance, are reduced at night time, whereas requirements for building security may be increased at night time. As another example, the office building 20 may include a conference room which is occupied during specific meeting times and otherwise unoccupied. Therefore, requirements for lighting and heating/cooling the conference room may be increased during the meeting times whereas requirements for lighting and heating/cooling other areas of the building may be decreased during the meeting times. Accordingly, the requirements for the systems 22, 24, 26 vary with time and vary between specific areas or rooms of the building 20. The system 22, 24, 26 controllers 30 may communicate with the BEMS 28 about the flexibility points.

In step 206, the BEMS 28 extracts historical electrical power consumption data from the flexibility points. As discussed above, the controllers 30 are operable to collect and analyze historical energy consumption data for the respective systems 22, 24, 26. Historical energy consumption data includes an electrical power consumption, or load profile, over time. The load profile may include occupant behavior, such as occupant climate or lighting preferences, occupancy times, etc. For instance, the load profile may include occupant inputs for a desired room temperature for a particular room via interface 32 of climate system 22 or for desired lighting preferences via interface 32 of lighting system 26. The load profile may also include occupant entry/exit times from the building 20, occupant locations within the building during various times, and the like. The load profile may also include information about the climate external to the building 20, which may affect the climate system 22 electrical energy requirements. In one example, the historical energy consumption data of the respective system 22, 26, 28 is stored in the corresponding controller 30 for a predetermined period of time.

In step 208, the BEMS 28 develops a mathematical model based on the historical electrical power consumption data from step 208. In some examples, the mathematical model is auto-generated by the BEMS 28 according to any know mathematical modeling methods. In another example, the mathematical model is based on a predetermined model basis that is stored in the BEMS 28.

The mathematical model can be used to extrapolate the historical energy consumption data to longer periods of time than data is available for. That is, if the historical energy consumption data is only available for one week, the mathematical model can be used to model historical energy consumption of the flexibility points over two weeks or a month, for instance. In one example, step 208 proceeds automatically, that is, without user or occupant input.

In step 210, the BEMS 28 estimates power flexibility for the flexibility points based on the mathematical models from step 208. Power flexibility represents an acceptable increase or reduction (e.g., a change) in the power demand of the building 20 and individual systems 22, 24, 26 from a previous power demand. An "acceptable" increase or reduction in the power demand of the building 20 or the individual systems 22, 24, 26 means the building 20 or systems 22, 24, 26 are still able to meet predetermined requirements, such as occupant comfort requirements or security requirements. In some examples, the power flexibility is a range (e.g., it has an upper and lower bounds).

In step 212, the BEMS 28 presents one or more flexibility options based on the power flexibility estimated in step 210. A flexibility option may be outside of the power flexibility from step 212. In this example, the flexibility option is paired with a comfort trade-off. A comfort trade-off is a deviation from the predetermined requirements for the building 20 as discussed above. For instance, a flexibility option may be outside of the power flexibility for the light system 26, and may be paired with a comfort trade-off of dimming the lights in certain rooms of the building 20. The BEMS 28 presents the flexibility options to a user via an interface 32. For example, a flexibility option regarding the climate system 22 is presented to the user/occupant via the interface 32 of the climate system 22. In further examples, the comfort trade-off may be presented to the user/occupant along with an incentive. For instance, the incentive may communicate to the user/occupant an electrical power savings that would result from selecting the comfort trade-off.

In step 214, the user selects a flexibility option from step 212 via the interface 32.

In step 216, the BEMS 28 communicates power set points to one or more of the systems 22, 24, 26 based on the selected flexibility option from step 214 via controllers 30. The power set point represents an amount of power that the systems 22, 24, 26 should consume while operating, and is determined by the BEMS 28 based on the selected flexibility option and other predetermined operating constraints of the building 20. For example, if the user/occupant selects a flexibility option that includes dimming the lights of the lighting system 24, and a predetermined operating condition of the building 20 dictates that the lights of the lighting system 24 may not be turned off completely, the BEMS 28 selects a power set point for the lighting system 24 that takes into account both the user/occupant choice and the predetermined operating condition.

In some examples, the systems 22, 24, 26 have components, and controllers 30 determine individual set points for the individual components. For instance, the climate system 22 can include chillers, pumps, air handling units, and other components known in the art. Likewise, the lighting and security systems 24, 26 can have components as are generally known in the art. In this way, the method 200 allows the user/occupant to make informed and in some cases, incentivized, decisions regarding the building 20 electrical power consumption that can result in reducing electrical power consumption of the building 20. In other words, a user/occupant of the building 20 can participate in controlling the electrical power usage of the building 20, as opposed to a remote user/operator.

In some examples, in step 218, the BEMS optimizes the power set points from step 216 according to known control methods. For instance, the BEMS may optimize the power set points by taking into account feedback information, such as measurements of certain operating parameters, from the systems 22, 24, 26.

In some examples, the BEMS 28 is configured to respond to a fast demand request from an electrical power source, such as the smart grid discussed above. A fast demand request is a request from the electrical power source to quickly change the power demand of the building 20 to a new power demand. For instance, the electrical power source may send fast demand requests at times of peak electrical power consumption.

In step 220, the BEMS 28 performs a check to determine whether a fast demand request is in progress. If yes, in step 222, the BEMS 28 performs a check to determine if the set points from step 216 are within the new power demand from the fast demand request. If yes, in step 224, the BEMS 28 presents one or more new flexibility options to the user/occupant that incorporate new incentives from the fast demand request via an interface 32. As above, the new flexibility options may be paired with comfort trade-offs. If no, the method 200 returns to step 218.

In step 226, the user select a new flexibility option via an interface 32. The method 200 then returns back to step 220 in a closed-loop manner.

If the set points from step 216 are not within the new power demand from the fast demand request, the method returns to step 218, in which the BEMS 28 attempts to optimize the set points to meet the new power demand.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for controlling power consumption, comprising:
   estimating power flexibility for one or more electrical systems in a building to determine at least one power flexibility option;
   presenting at a user interface the at least one power flexibility option to a user in the building such that the user can select a selected power flexibility option, wherein the at least one power flexibility option includes a comfort trade-off that represents a deviation from a predetermined comfort requirement; and
   communicating power set points to the one or more electrical systems based on the selected power flexibility option.

2. The method of claim 1, further comprising discovering power flexibility points in the building, and estimating power flexibility at the power flexibility points.

3. The method of claim 1, wherein the estimating is based on historical electrical power consumption data of the one or more electrical systems.

4. The method of claim 3, wherein the estimating includes developing a mathematical model of electrical power consumption of the one or more electrical systems based on the historical electrical power consumption data.

5. The method of claim 1, further comprising optimizing the power set points.

6. The method of claim 1, further comprising performing a check to determine whether a fast demand request from an electrical power source is in progress.

7. The method of claim 6, further comprising performing a check to determine whether the power set points are within a new power demand of the fast demand request if a fast demand request is in progress.

8. The method of claim 7, further comprising presenting one or more new flexibility options to the user if the power set points are within the new power demand.

9. The method of claim 1, wherein the one or more electrical systems include at least one of a climate system, a lighting system, and a security system.

10. A system for predicting energy consumption of a building, comprising:
- one or more electrical systems;
- one or more interfaces at each of the electrical systems; and
- a computing device in communication with the one or more electrical systems and configured to estimate power flexibility for the one or more electrical systems to determine at least one power flexibility option, wherein the at least one power flexibility option includes a comfort trade-off that represents a deviation from a predetermined comfort requirement, present the at least one power flexibility option to a user via the one or more interfaces such that the user can select a selected power flexibility option, and communicate power set points to the one or more electrical systems based on the selected power flexibility option.

11. The system of claim 10, wherein the building energy management system is configured to estimate power flexibility at flexibility points in the building, and wherein the one or more flexibility points are controllers of the one or more electrical systems.

12. The system of claim 10, wherein each of the one or more electrical systems includes a controller, and wherein the controllers receive the power set points from the computing device.

13. The system of claim 10, wherein the building energy management system is configured to model electrical power consumption of the one or more electrical systems based on historical electrical power consumption data of the one or more electrical systems.

14. The system of claim 10, wherein the computing device is in communication with an electrical power source.

15. The system of claim 14, wherein the electrical power source is a smart grid.

16. The system of claim 14, wherein the electrical power source is configured to determine whether a fast demand request from the electrical power source is in progress.

17. The system of claim 16, wherein the electrical power source is configured to present new flexibility options to a user if a fast demand request is in progress.

18. The system of claim 10, wherein the one or more electrical systems include at least one of a climate system, a lighting system, and a security system.

\* \* \* \* \*